(12) United States Patent
Suzuki

(10) Patent No.: US 12,025,852 B2
(45) Date of Patent: Jul. 2, 2024

(54) IMAGE PICKUP APPARATUS, LENS APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Kazuto Suzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 369 days.

(21) Appl. No.: 17/159,521

(22) Filed: Jan. 27, 2021

(65) Prior Publication Data

US 2021/0239934 A1 Aug. 5, 2021

(30) Foreign Application Priority Data

Jan. 30, 2020 (JP) .................................. 2020-014224
Jan. 30, 2020 (JP) .................................. 2020-014225

(51) Int. Cl.
*G02B 7/09* (2021.01)
*G02B 7/105* (2021.01)
*G03B 13/36* (2021.01)

(52) U.S. Cl.
CPC .............. *G02B 7/09* (2013.01); *G02B 7/105* (2013.01); *G03B 13/36* (2013.01)

(58) Field of Classification Search
CPC . G02B 7/09; G02B 7/105; G02B 7/28; G02B 27/64; G02B 27/646; G03B 13/32;
(Continued)

(56) References Cited

U.S. PATENT DOCUMENTS

| 5,649,245 A | * | 7/1997 | Inoue | ..................... G03B 17/18 396/299 |
| 5,872,661 A | | 2/1999 | Suzuki et al. | |

(Continued)

FOREIGN PATENT DOCUMENTS

| JP | H02-312456 A | 12/1990 |
| JP | H06-167648 A | 6/1994 |

(Continued)

OTHER PUBLICATIONS

Notice of Reasons for Rejection issued by the Japan Patent Office dated Aug. 2, 2022 in corresponding JP Patent Application No. 2020-014227, with English translation.
(Continued)

*Primary Examiner* — Jie Lei
(74) *Attorney, Agent, or Firm* — Carter, DeLuca & Farrell LLP

(57) ABSTRACT

An image pickup apparatus (200) includes a display unit (204) capable of displaying an object distance in an optical system capable of performing first control in which a focus lens is automatically adjusted to an in-focus position and second control in which the focus lens is adjusted based on an operation amount of a user, and a controller (206) configured to control the display unit, and the controller is configured to control the display unit so that information corresponding to a current focus lens position and information on a first range in which the focus lens cannot be driven by the first control and the focus lens can be driven by the second control are displayed together.

18 Claims, 11 Drawing Sheets

(58) Field of Classification Search
CPC ........ G03B 13/36; G03B 17/02; H04N 23/63; H04N 23/633; H04N 23/663; H04N 23/67; H04N 23/632; H04N 23/69; H04N 23/675; H04N 23/673; H04N 23/959
See application file for complete search history.

(56) References Cited

U.S. PATENT DOCUMENTS

| | | | |
|---|---|---|---|
| 6,731,339 B2 | 5/2004 | Ohkawara | |
| 9,645,473 B2 | 5/2017 | Tsuruoka | |
| 9,842,117 B1 | 12/2017 | Zhou et al. | |
| 10,165,188 B2 | 12/2018 | Kakimoto | |
| 10,230,887 B2 | 3/2019 | Okuyama et al. | |
| 10,412,292 B2 | 9/2019 | Uemura | |
| 10,587,811 B2 | 3/2020 | Ise | |
| 10,638,033 B2 | 4/2020 | Tomosada et al. | |
| 10,834,326 B2 | 11/2020 | Ichinose | |
| 2002/0075395 A1 | 6/2002 | Ohkawara | |
| 2006/0133791 A1* | 6/2006 | Miyata | H04N 23/69 348/E5.045 |
| 2006/0140608 A1 | 6/2006 | Triteyaprasert et al. | |
| 2009/0115883 A1* | 5/2009 | Tsuchiya | G03B 13/00 348/E5.024 |
| 2011/0158627 A1 | 6/2011 | Hirai et al. | |
| 2012/0057062 A1 | 3/2012 | Hamada et al. | |
| 2013/0321692 A1 | 12/2013 | Kawanishi | |
| 2014/0300716 A1 | 10/2014 | Tsuruoka | |
| 2015/0085177 A1 | 3/2015 | Okada | |
| 2015/0215518 A1 | 7/2015 | Nishiguchi et al. | |
| 2016/0014325 A1 | 1/2016 | Okada | |
| 2016/0212323 A1 | 7/2016 | Ishii | |
| 2016/0306135 A1* | 10/2016 | Kakimoto | H04N 23/69 |
| 2016/0320588 A1 | 11/2016 | Kindaichi et al. | |
| 2017/0034424 A1 | 2/2017 | Uemura | |
| 2017/0099428 A1 | 4/2017 | Okuyama et al. | |
| 2018/0349005 A1* | 12/2018 | Bhargava | G06F 3/04847 |
| 2019/0182432 A1 | 6/2019 | Ise | |
| 2019/0353988 A1 | 11/2019 | Yamasaki | |
| 2019/0356843 A1 | 11/2019 | Uemura | |

FOREIGN PATENT DOCUMENTS

| | | |
|---|---|---|
| JP | H09-80299 A | 3/1997 |
| JP | H09197253 A | 7/1997 |
| JP | 2003-337277 A | 11/2003 |
| JP | 2006184816 A | 7/2006 |
| JP | 2012133218 A | 7/2012 |
| JP | 2013024977 A | 2/2013 |
| JP | 2015-041901 A | 3/2015 |
| JP | 2016-012140 A | 1/2016 |
| JP | 5843442 B2 | 1/2016 |
| JP | 2017-009961 A | 1/2017 |
| JP | 2019-074598 A | 5/2019 |
| JP | 2019082646 A | 5/2019 |
| JP | 2019-219583 A | 12/2019 |
| JP | 2019-219584 A | 12/2019 |

OTHER PUBLICATIONS

Non-Final Office Action issued by the U.S. Patent and Trademark Office dated Jul. 8, 2022 in corresponding U.S. Appl. No. 17/521,197.
Notice of Allowance issued by the U.S. Patent and Trademark Office dated Aug. 25, 2021 in corresponding U.S. Appl. No. 17/159,542.
Notice of Allowance issued by the U.S. Patent and Trademark Office dated Mar. 8, 2023 in corresponding U.S. Appl. No. 17/521,197.
Notice of Reasons for Refusal issued by the Japanese Patent Office dated Oct. 3, 2023 in corresponding JP Patent Application No. 2020-014225, with English translation.
Notice of Reasons for Refusal issued by the Japanese Patent Office dated Oct. 31, 2023 in corresponding JP Patent Application No. 2020-014224, with English translation.
Decision of Refusal issued by the Japanese Patent Office on Dec. 26, 2023 in corresponding JP Patent Application No. 2020-014225, with English translation.
Notice of Reasons for Refusal issued by the Japanese Patent Office on Dec. 5, 2023 in corresponding JP Patent Application No. 2022-203804, with English translation.
Notice of Reasons for Refusal issued by the Japanese Patent Office on Apr. 30, 2024 in corresponding JP Patent Application No. 2022-203804, with English translation.

* cited by examiner

IMAGE PICKUP APPARATUS, LENS APPARATUS, CONTROL METHOD, AND NON-TRANSITORY COMPUTER-READABLE STORAGE MEDIUM

BACKGROUND OF THE INVENTION

Field of the Invention

The present invention relates to an image pickup apparatus capable of driving a focus lens to perform focusing and a control method thereof.

Description of the Related Art

Autofocusing (AF) and manual focusing (MF) are known as methods for driving a focus lens to perform focusing. The AF is a method of performing focusing by calculating an in-focus position of the focus lens based on an AF evaluation value generated from an AF sensor. The MF is a method in which a user manually operates a focus ring to perform the focusing. Here, a drive range of the focus lens where the focusing is possible by both the AF and the MF is referred to as an AF available range, and a drive range w % here the focusing is possible only by the MF is referred to as an MF dedicated range.

Japanese Patent Laid-open No. 2019-74598 discloses an image pickup apparatus that digitally expresses a distance index display relating to a distance from a lens to an object.

SUMMARY OF THE INVENTION

The present invention provides an image pickup apparatus including a display unit capable of displaying an object distance in an optical system capable of performing first control in which a focus lens is automatically adjusted to an in-focus position and second control in which the focus lens is adjusted based on an operation amount of a user, and a controller configured to control the display unit, and the controller is configured to control the display unit so that information corresponding to a current focus lens position and information on a first range in which the focus lens cannot be driven by the first control and the focus lens can be driven by the second control are displayed together.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
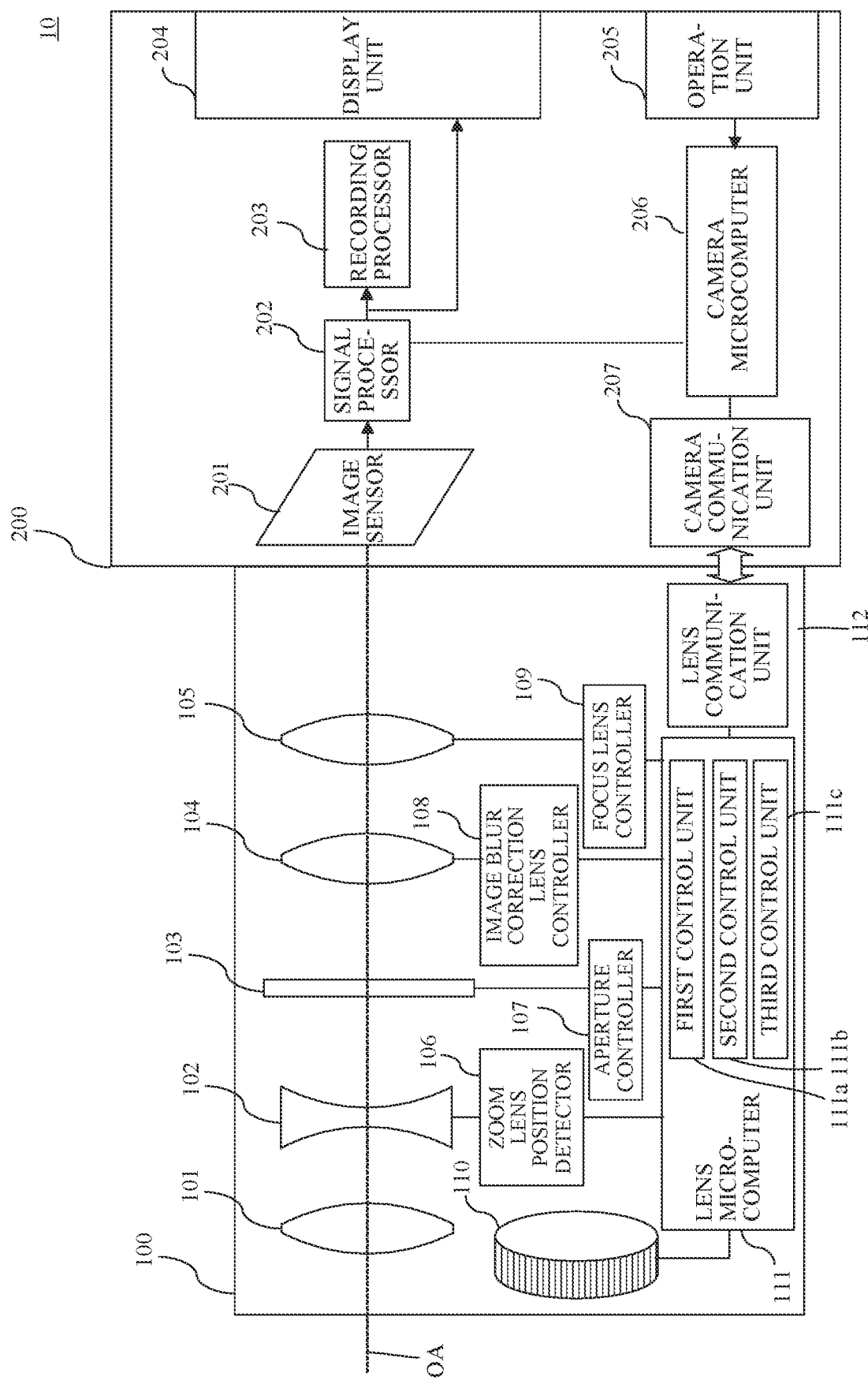
FIG. 1 is a block diagram of an image pickup apparatus in each embodiment.

First, a configuration of an image pickup apparatus in each embodiment will be described. FIG. 1 is a block diagram of an image pickup apparatus 10. The image pickup apparatus 10 includes a camera body (image pickup apparatus body) 200 and an interchangeable lens (lens apparatus) 100 removably attached to the camera body 200. However, the image pickup apparatus of each embodiment is not limited to this, and the camera body and the lens apparatus may be integrally configured.

The interchangeable lens 100 is mechanically and electrically connected to the camera body 200 via a mount (not illustrated). The interchangeable lens 100 receives power from the camera body 200 via a power supply terminal (not illustrated) provided on the mount described above. Then, the interchangeable lens 100 controls various actuators and a lens microcomputer 111, which will be described below, by using the power received from the camera body 200. The camera body 200 communicates with the interchangeable lens 100 via a communication terminal (not illustrated) provided on the mount described above, and controls the interchangeable lens 100 by transmitting a control command to the interchangeable lens 100.

The camera body 200 includes an image sensor 201 having a function as a phase difference AF sensor, a signal processor 202, a recording processor 203, a display unit 204, an operation unit 205, and a camera microcomputer 206. The image sensor 201 includes a CMOS sensor or a CCD sensor, and photoelectrically converts an object image (optical image) formed by an image pickup optical system in the interchangeable lens 100 to output an electric signal (analog signal). The analog signal output from the image sensor 201 is converted into a digital signal by an A/D conversion circuit (not illustrated).

The signal processor 202 performs various image processing on the digital signal from the A/D conversion circuit to generate a video signal. Further, the signal processor 202 generates a contrast state of the object image, that is, focus information indicating a focus state of the image pickup optical system and luminance information indicating an exposure state from the video signal. Further, the signal processor 202 outputs the video signal to the display unit 204, and the display unit 204 displays the video signal as a live view image used for checking the composition, the focus state, and the like. Further, the signal processor 202 outputs the video signal to the recording processor 203. The recording processor 203 stores the video signal as still image or moving image data in an external memory or the like.

The camera microcomputer 206 as a camera control unit (controller) controls the camera body 200 in response to inputs from an image pickup instruction switch and various setting switches included in the operation unit 205. Further, the camera microcomputer 206 sends control commands related to a light amount adjusting operation of an aperture unit 103 according to the luminance information and a focusing operation of the focus lens 105 according to the focus information via the camera communication unit (communication unit) 207. Further, the camera microcomputer 206 communicates with the interchangeable lens 100 via the camera communication unit 207, and acquires display information for displaying a second drive range (first range) on the display unit 204 from the interchangeable lens 100. Here, the display information is, for example, a drive range (first drive range and second drive range) including each position obtained by dividing an entire drive range of the focus lens 105 into 100, a numerical position to be displayed, or the like. Further, the camera microcomputer 206 has a function of controlling the display of the display unit 204.

The interchangeable lens 100 includes the image pickup optical system, control units that control respective actuators that drive the image pickup optical system, an operation ring 110 for operating the focus lens 105, and the lens microcomputer 111.

The lens microcomputer 111 is a lens control unit (control apparatus, or controller) that controls an operation of each unit in the interchangeable lens 100.

The lens microcomputer 111 receives a control command transmitted from the camera body 200 to receive a transmission request for a lens data via a lens communication unit (communication unit) 112 capable of communicating with the camera body 200. Further, the lens microcomputer 111 controls the lens corresponding to the control command, and transmits the lens data corresponding to the transmission request to the camera body 200. Further, the lens microcomputer 111 outputs a command to an aperture controller 107 and a focus lens controller 109 in response to a command related to light amount adjustment and a command related to focusing among the control commands. The aperture controller 107 and the focus lens controller 109 drive the aperture unit 103 and the focus lens 105, respectively, in accordance with the command from the lens microcomputer 111. Thereby, the light amount adjustment process by the aperture unit 103 and the autofocus process for controlling the focusing operation by the focus lens 105 can be performed. Further, the lens microcomputer 111 outputs a command to the focus lens controller 109 to drive the focus lens 105 to control the focusing operation according to an operation amount of the operation ring 110.

In each embodiment, the lens microcomputer 111 includes a first control unit 111a, a second control unit 111b, and a third control unit 111c. The first control unit 111a automatically adjusts the focus lens 105 to the in-focus position, that is, the first control unit 111a has a function of realizing AF control. The second control unit 111b adjusts the focus lens 105 manually (based on the operation amount by the user), that is, the second control unit 111b has a function of realizing MF control. The third control unit 111c drives the focus lens 105 (zoom tracking control, etc.). The first control unit 111a and the second control unit 111b are effective in the first drive range (AF available range, or second range) of the focus lens 105, and the first control unit 111a is ineffective in the second drive range (MF dedicated range) of the focus lens 105. The third control unit 111c has a function of driving the focus lens 105 based on a change of the second drive range, that is, a change of increase and decrease in a ratio of the second drive range in the entire drive range.

In this embodiment, an example in which the lens microcomputer 111 includes the first control unit 111a, the second control unit 111b, and the third control unit 111c is described. This may be equivalent to the fact that the lens microcomputer 111 has a function corresponding to the function of the first control unit 111a, a function corresponding to the function of the second control unit 111b, and a function corresponding to the function of the third control unit 111c.

Further, in each embodiment, the display unit 204 displays information corresponding to a current focus lens position (not limited to the current focus lens position, and may include an in-focus distance, etc.) and the second drive range.

The image pickup optical system includes a field lens 101, a zoom lens 102 for varying magnification, that is, performing zooming, the aperture unit 103 for adjusting the light amount, an image blur correction lens 104, and the focus lens 105 for performing focusing. The zoom lens 102 is movable in a direction (optical axis direction) along an optical axis OA illustrated by a dashed line in the drawing, and it is driven in the optical axis direction by the user operating the zoom operation unit connected to a zoom mechanism (not illustrated). As a result, the zooming is performed in which a focal length of the image pickup optical system is changed by moving the zoom lens 102.

A zoom lens position detector 106 detects the zoom lens position using a position detection sensor such as a variable resistor, and outputs position data of the zoom lens 102 to the lens microcomputer 111. The position data output from the zoom lens position detector 106 is used by the lens microcomputer 111 for zoom tracking control and the like, which will be described below.

The aperture unit 103 is configured to include aperture blades and a sensor such as a hall element. The state of the aperture blades is detected by the sensor and output to the lens microcomputer 111. The aperture controller 107 outputs a drive signal to drive an actuator such as a stepping motor or a voice coil motor in accordance with a command from the lens microcomputer 111. As a result, the light amount can be adjusted by the aperture unit 103.

The image blur correction lens 104 moves in a direction orthogonal to the optical axis OA of the image pickup optical system to reduce image blur caused by camera shake or the like. An image blur correction lens controller 108 outputs a drive signal to drive an image stabilization actuator in accordance with a command from the lens microcomputer 111 in response to the shake detected by a vibration sensor (not illustrated) such as a vibration gyro. As a result, image stabilization processing that controls a shift operation of the image blur correction lens 104 can be performed.

The focus lens 105 is movable in the optical axis direction, and it detects the position of the focus lens 105 using a position detection sensor such as a photo interrupter, and outputs position data to the lens microcomputer 111. The focus lens controller 109 outputs a drive signal to drive an actuator such as a stepping motor in accordance with a command from the lens microcomputer 111, and moves the focus lens 105 to perform the focusing.

Further, the focus lens 105 corrects an image plane fluctuation due to the magnification variation caused by the zoom lens 102. In a rear focus zoom optical system, zoom tracking control that corrects the image plane fluctuation that occurs when the zoom lens 102 is moved to perform zooming by moving the focus lens 105 to maintain the in-focus state is performed.

Figure 2:
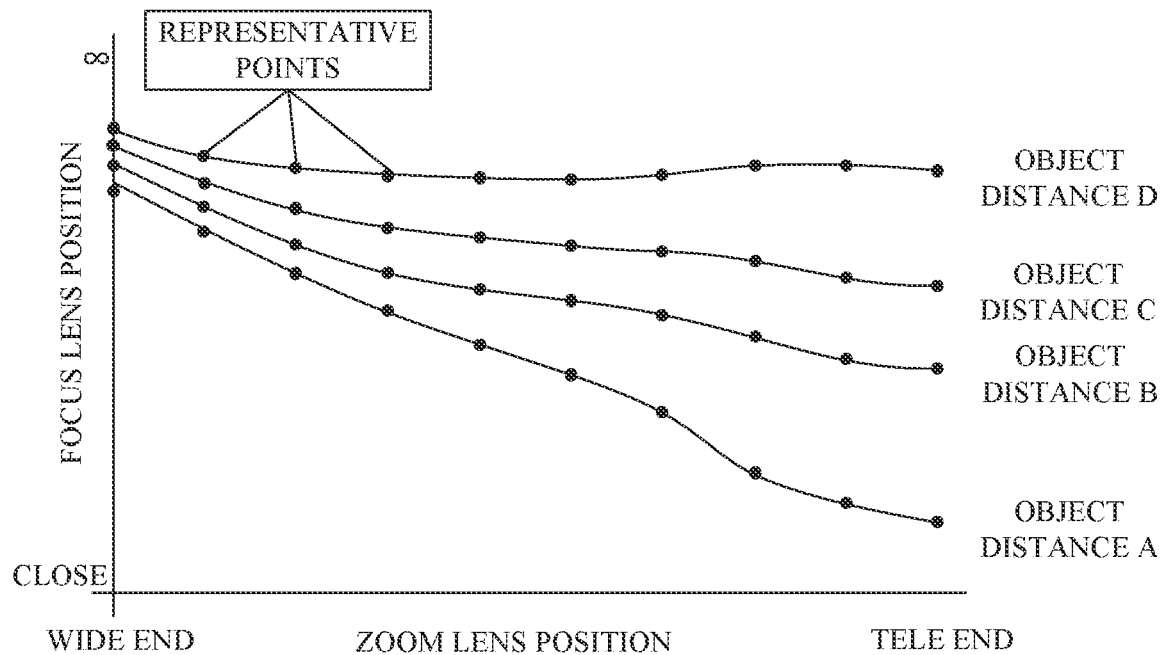
FIG. 2 is a diagram illustrating electronic cam data for each object distance in each embodiment.

Here, referring to FIG. 2, the zoom tracking control will be described. FIG. 2 is a diagram illustrating electronic cam data for each object distance. In FIG. 2, the horizontal axis represents the position of the zoom lens 102 (zoom lens position), and the vertical axis represents the position of the focus lens 105 (focus lens position). In order to perform the zoom tracking control, information on the electronic cam data (tracking curve) is stored in a memory (internal memory) (not illustrated) provided in the lens microcomputer 111. As illustrated in FIG. 2, the electronic cam data are data indicating the relationship between the zoom lens position and the focus lens position set to maintain the in-focus state according to the object distance. The lens microcomputer 111 outputs a control command to the focus lens controller 109 based on the electronic cam data, and it drives the focus lens 105 to perform the tracking control.

In each embodiment, the electronic cam data is created based on a focus sensitivity, which is a moving amount of the image plane with respect to a unit drive amount of the focus lens 105. However, as illustrated in FIG. 2, the electronic cam data actually stored in the memory are data corresponding to a plurality of typical object distances A to D and are data indicating focus lens positions with respect to a representative zoom lens positions (representative points). The focus lens position can be calculated by calculating a ratio of the distances to a plurality of representative points close to the zoom lens positions other than the representative points and performing linear interpolation according to the ratio.

Figure 3:
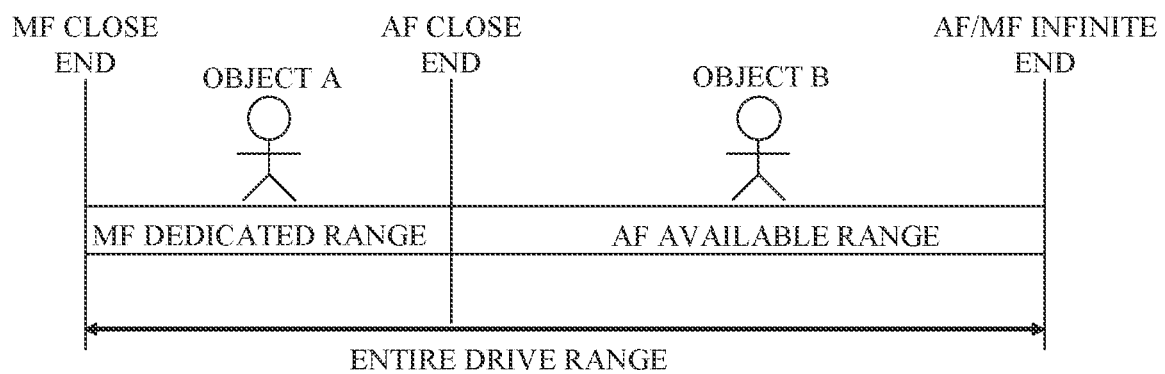
FIG. 3 is a diagram illustrating an AF available range and an MF dedicated range in each embodiment.

Next, referring to FIG. 3, the AF available range and the MF dedicated range will be described. FIG. 3 is a diagram illustrating the AF available range and the MF dedicated range. Here, the AF available range is a range where the focusing can be performed by both the AF and the MF, and the MF dedicated range is a range where the focusing can be performed only by the MF. In this embodiment, the AF available range is the range between AF/MF infinite ends and an AF close end, and the MF dedicated range is the range between an MF close end and the AF close end. Further, in this embodiment, the entire drive range is a sum of the AF available range and the MF dedicated range.

The image pickup apparatus 10 of each embodiment can drive the focus lens 105 to perform the focusing by autofocusing (AF) that automatically performs the focusing and manual focusing (MF) that manually performs the focusing. In the AF, the camera microcomputer 206 calculates the in-focus position of the focus lens 105 based on the AF evaluation value corresponding to the video signal generated by the image sensor 201, and transmits control command related to focusing to the lens microcomputer 111 via the camera communication unit 207. The lens microcomputer 111 outputs a command to the focus lens controller 109 in response to the control command transmitted from the camera microcomputer 206, and drives the focus lens 105 to control the focusing operation. In the MF, the lens microcomputer 111 outputs a command to the focus lens controller 109 according to the operation amount of the operation ring 110, drives the focus lens 105 to control the focusing operation.

The AF available range illustrated in FIG. 3 is a range in which the focusing can be performed by both the AF and the MF. Therefore, the object B existing in the AF available range can be focused by both the AF and the MF. On the other hand, the MF dedicated range illustrated in FIG. 3 is a range in which the AF evaluation value cannot be calculated accurately, and accordingly the focusing cannot be performed by the AF and the focusing can be performed only by the MF. Therefore, the object A existing in the MF dedicated range can be focused only by the MF.

Figure 4:
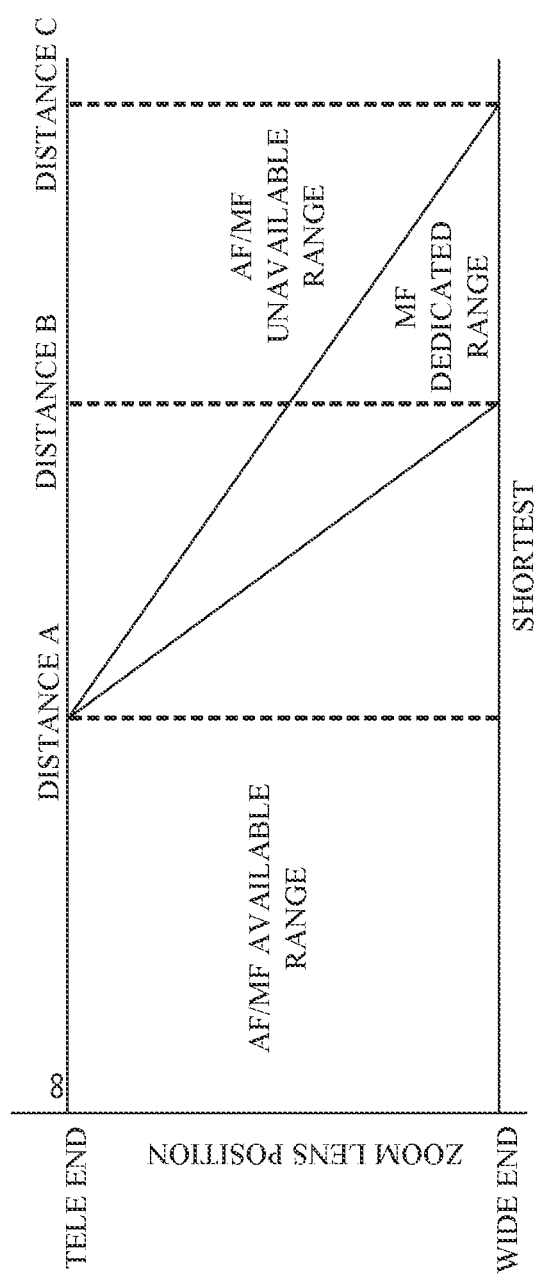
FIG. 4 is a diagram illustrating the relationship between a zoom lens position and a shortest shooting distance in each embodiment.

Next, referring to FIG. 4, the relationship between the zoom lens position and the shortest shooting distance will be described. FIG. 4 is a diagram illustrating the relationship between the zoom lens position and the shortest shooting distance. In FIG. 4, the vertical axis represents the zoom lens position (position of the zoom lens 102), and the horizontal axis represents the shortest shooting distance. As illustrated in FIG. 4, the shortest shooting distance changes according to the position of the zoom lens 102, and the shooting distance position, which is the AF available range on the WIDE side, becomes the MF dedicated range on the TELE side. As described above, in this embodiment, the AF available range (AF/MF available range) and the MF dedicated range are switched according to the zoom position.

Figure 5:
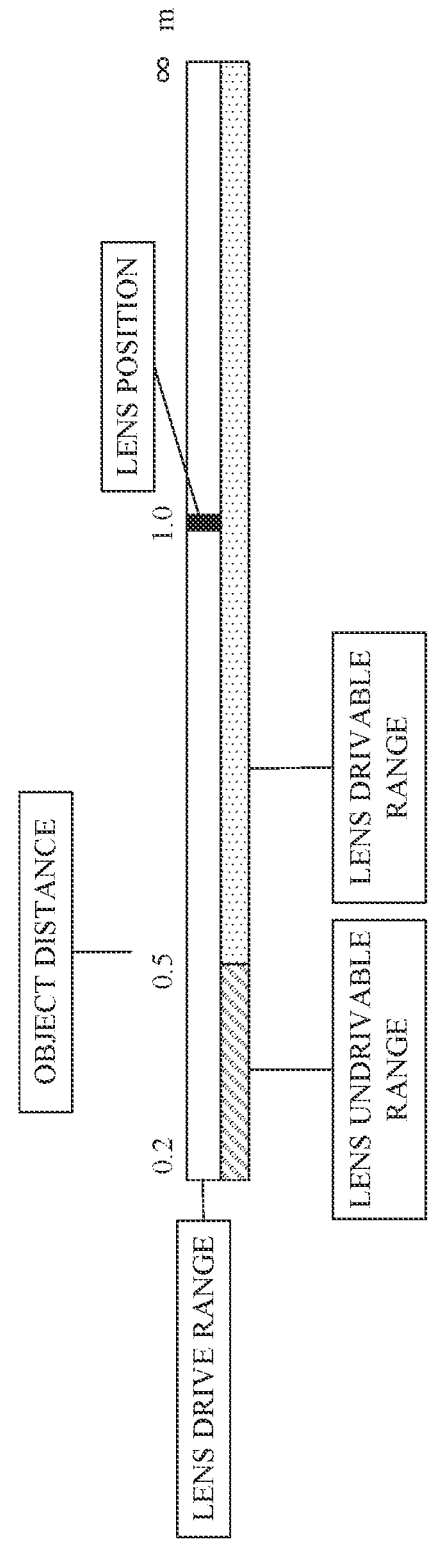
FIG. 5 is a diagram illustrating a distance index display that does not include the MF dedicated range in each embodiment.

The camera body 200 of each embodiment includes the display unit 204, and displays a distance index of the focus lens 105 on the display unit 204. FIG. 5 is a diagram illustrating a distance index display that does not include the MF dedicated range. As illustrated in FIG. 5, the distance index display includes a display related to a distance scale indicating the object distance, a lens position, a lens drive range, a lens undrivable range, and a lens drivable range. The lens drive range indicates a drive range of the focus lens 105. The lens position indicates the position of the focus lens 105. The lens drive range changes according to the focal length and the like, and includes the lens undrivable range and the lens drivable range. In the example of FIG. 5, it is possible to drive the focus lens 105 so as to focus on an object at a distance of 0.2 m to an infinite distance. The range where an object of 0.2 m to 0.5 m is focused by the setting such as zooming is the lens undrivable range. The current lens position indicates that an object at a distance of 1.0 m is in focus.

Hereinafter, the distance index display method in each embodiment will be described in detail.

First Embodiment

Figure 6:
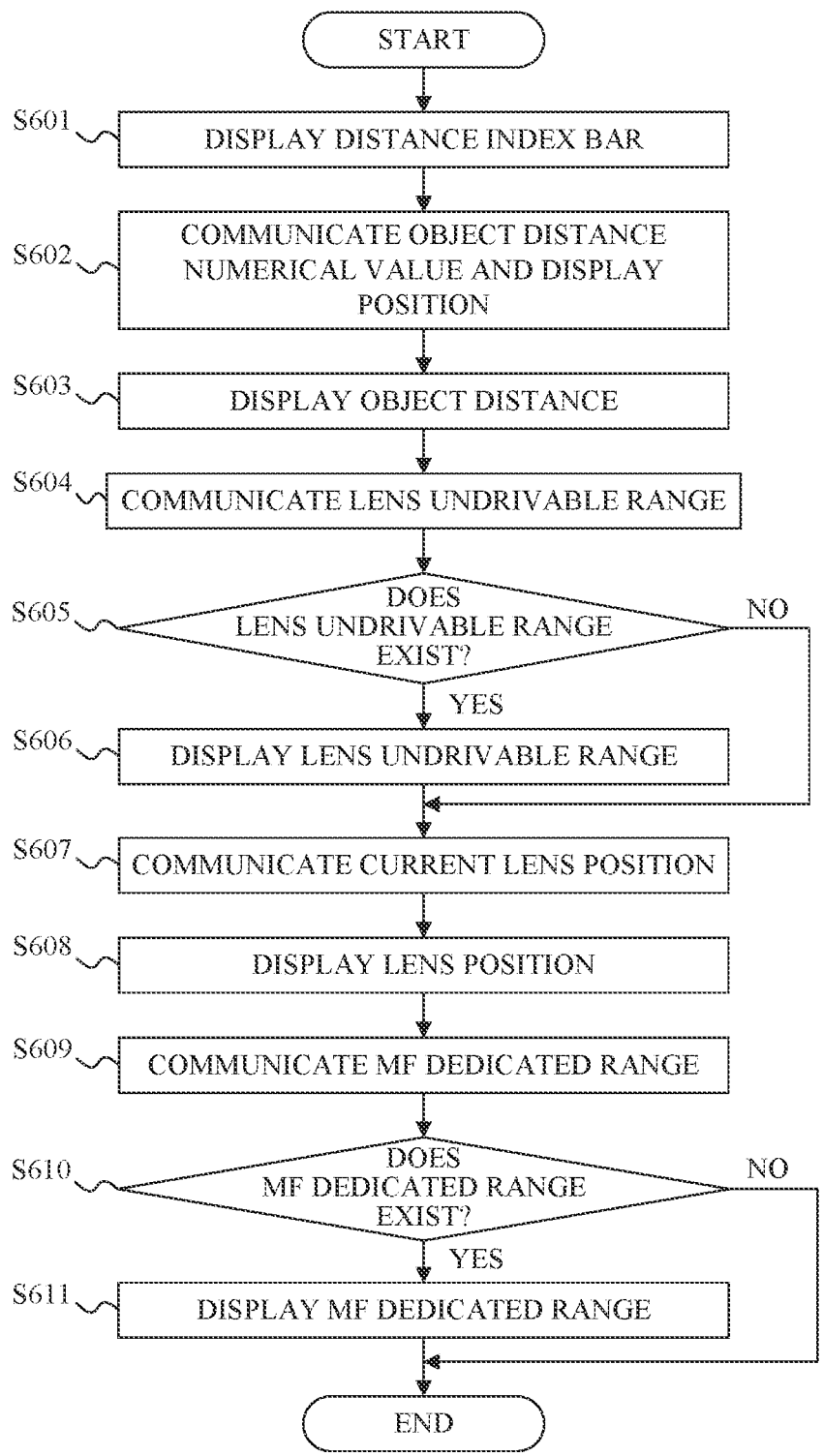
FIG. 6 is a flowchart illustrating a distance index display method in a first embodiment.
Figure 7:
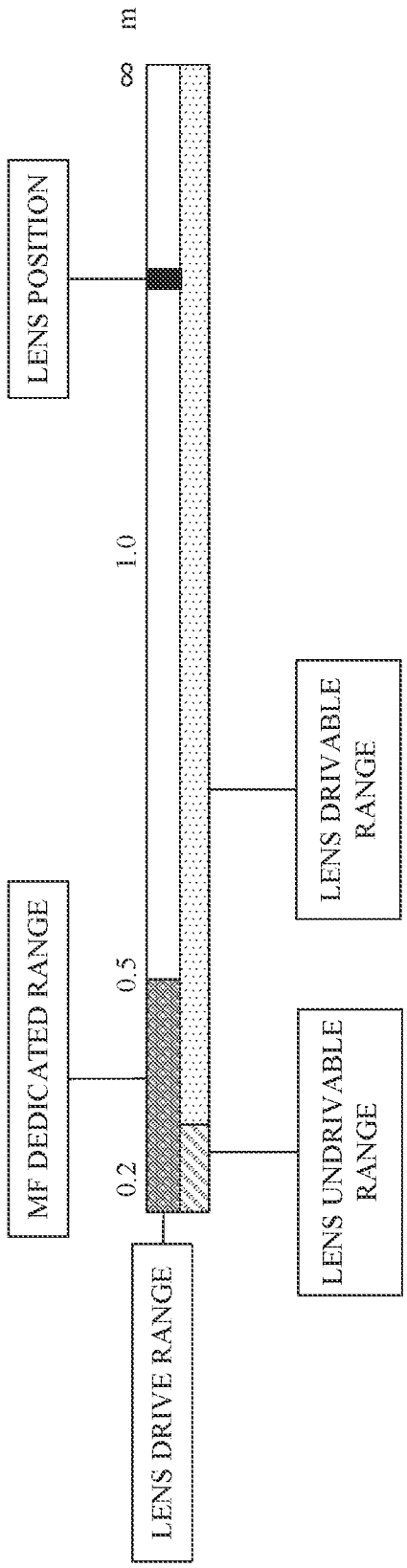
FIG. 7 is a diagram illustrating a distance index display including the MF dedicated range in the first embodiment.

First, referring to FIGS. 6 and 7. Embodiment 1 of the present invention will be described. FIG. 6 is a flowchart illustrating a control method (a distance index display method, that is, a method of displaying a distance index including the MF dedicated range) in this embodiment. FIG. 7 is a diagram illustrating a distance index display including the MF dedicated range in this embodiment.

First, in step S601, the camera microcomputer 206 of the camera body 200 displays a distance index bar on the display unit 204. Subsequently, in step S602, the camera microcomputer 206 communicates with the lens microcomputer 111 of the interchangeable lens 100 to acquire information on an object distance numerical value (that is, a numerical value of a distance scale to be displayed) and a display position (that is, a position where the numerical value is displayed). Subsequently, in step S603, the camera microcomputer 206 displays the object distance (distance scale) on the display unit 204.

Subsequently, in step S604, the camera microcomputer 206 communicates with the lens microcomputer 111 to acquire information on the lens undrivable range. Subsequently, in step S605, the camera microcomputer 206 determines whether or not the interchangeable lens 100 has the lens undrivable range. If the interchangeable lens 100 has the lens undrivable range, the process proceeds to step S606. On the other hand, if the interchangeable lens 100 does not have the lens undrivable range, the process proceeds to step S607.

In step S606, the camera microcomputer 206 displays the lens undrivable range on the display unit 204. In step S607, the camera microcomputer 206 communicates with the lens microcomputer 111 to acquire information on the current lens position. Subsequently, in step S608, the camera microcomputer 206 displays the lens position on the display unit 204.

Subsequently, in step S609, the camera microcomputer 206 communicates with the lens microcomputer 111 to acquire the position information of the MF dedicated range. Subsequently, in step S610, the camera microcomputer 206 determines whether or not the interchangeable lens 100 has the MF dedicated range. If the interchangeable lens 100 has the MF dedicated range, the process proceeds to step S611. In step S611, the camera microcomputer 206 displays the MF dedicated range on the display unit 204, and this flow ends. On the other hand, if the interchangeable lens 100 does not have the MF dedicated range in step S610, this flow (distance index display method) ends. By repeating this flow at a predetermined cycle, the display such as the lens position can be updated.

FIG. 7 is a diagram illustrating a distance index display including the MF dedicated range in this embodiment, and is a diagram in which a numerical value of the distance scale, an undrivable range, and the MF dedicated range are added on the distance index bar. As illustrated in FIG. 7, the display unit 204 displays distances from the shortest shooting distance to a predetermined object distance, and also displays the AF available range, the MF dedicated range, and the current drivable range of the focus lens 105. In the example of FIG. 7, the range of the object distance from 0.2 m to 0.5 m is the MF dedicated range. The user can know through the display unit 204 that the focus lens 105 can be driven only by the MF when the focus lens 105 is located in the lens drivable range of the MF dedicated range. By adding information on the MF dedicated range to the distance index display in this way to display the information, the user can visually know the switching position between the MF dedicated range and the AF available range, and the operability is improved.

In this embodiment, the display illustrated in FIG. 7 is used as an example, but the distance scale may use other notation methods such as the imperial system in addition to the metric table. Further, the distance scale of a numerical value other than the numerical value described in this embodiment may be displayed. Further, in FIG. 7, the MF dedicated range is expressed by changing the color and pattern of the distance index bar, but this embodiment is not limited to this. That is, the display unit 204 may be configured to display the AF available range and the MF dedicated range separately. Therefore, not only the AF available range and the MF dedicated range may be displayed in different colors and patterns, but also the thickness, edging, or line type may be different from each other. Further, the display unit 204 may be configured to notify that the focus lens 105 is located in the MF dedicated range. For example, it is possible to notify the user that he/she is in the MF dedicated range by blinking at least a part of the display unit 204 including the distance display bar or displaying a message or an icon. Further, each information on the distance index does not have to be displayed according to the flow of FIG. 6.

Second Embodiment

Next, referring to FIGS. 8 to 11. Embodiment 2 of the present invention will be described. The image pickup apparatus 10 of this embodiment has a function of setting a limit on the AF available range of the interchangeable lens 100. For example, by setting the limit in the AF available range at an object distance close to the image pickup apparatus 10, it is possible to quickly focus on a distant object.

Figure 8:
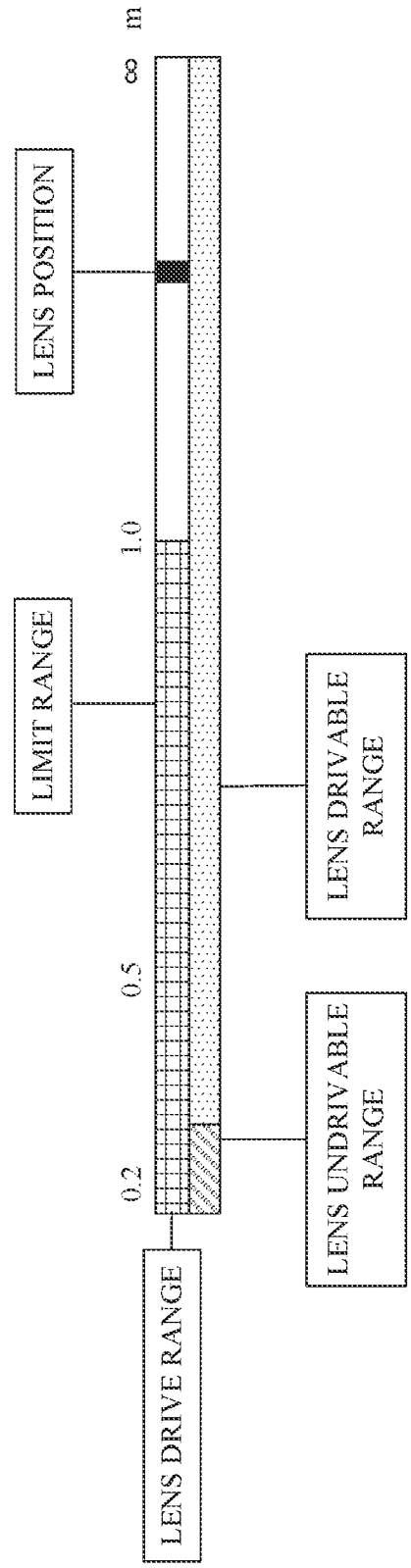
FIG. 8 is a diagram illustrating a distance index display including an AF limit range in a second embodiment.

FIG. 8 is a diagram illustrating a distance index display including a limit range (AF limit range) in this embodiment, and it illustrates the distance index display when an AF limit is provided in the AF available range. In the example of FIG. 8, the user can know that the range of the object distance from 0.2 m to 1.0 m is the AF limit range.

Here, the difference between the AF limit range and the MF dedicated range will be described. It is not possible to perform all AF operations in the MF dedicated range, but it is possible to start the AF in the AF limit range. When the AF is started in the AF limit range, the interchangeable lens 100 can drive the focus lens 105 only in a direction of exiting the AF limit range. Further, when the image pickup apparatus 10 is in focus on the object wvhile the focus lens 105 is being driven in the direction of exiting the AF limit range, the AF can be completed. As described above, the MF dedicated range and the AF limit range are different ranges from each other, and it is necessary to display them differently on the distance index display.

Figure 9:
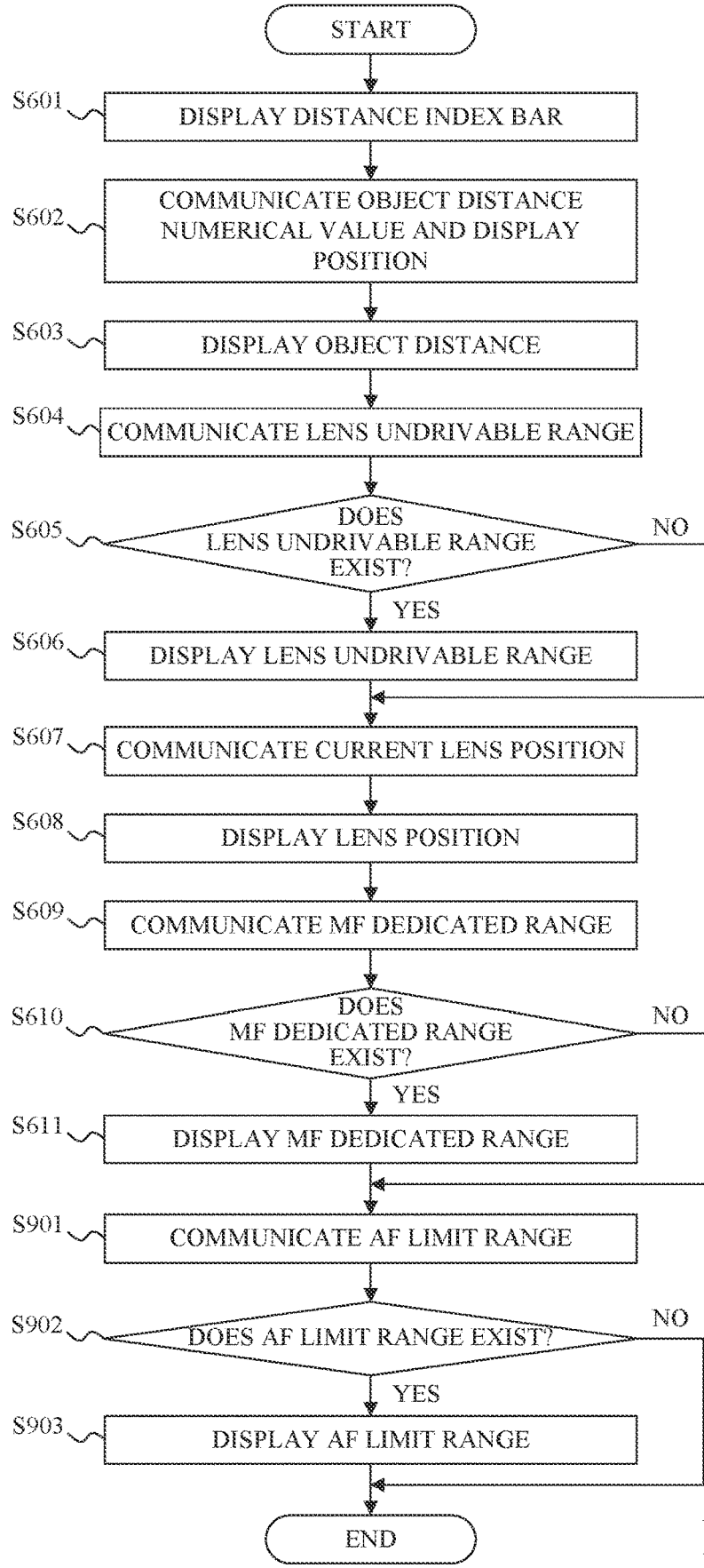
FIG. 9 is a flowchart illustrating a distance index display method in the second embodiment.
Figure 10:
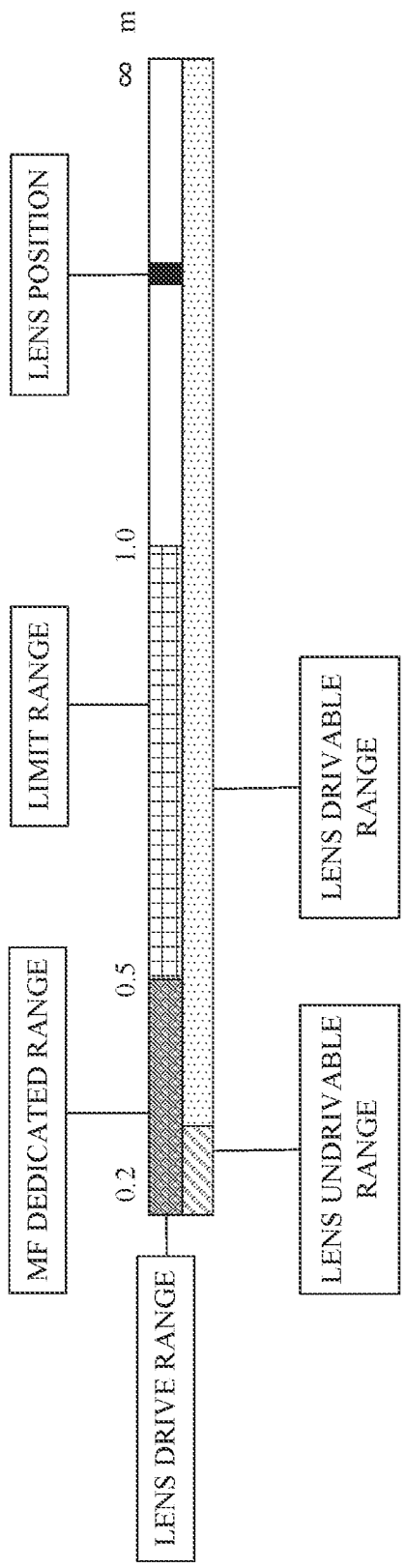
FIG. 10 is a diagram illustrating a distance index display including an AF limit range and an MF dedicated range in the second embodiment.

FIG. 9 is a flowchart illustrating a control method (distance index display method including the AF limit range and the MF dedicated range) in this embodiment. FIG. 10 is a diagram illustrating the distance index display including the AF limit range and the MF dedicated range in this embodiment. Referring to FIGS. 9 and 10, the distance index display method including the AF limit range and the MF dedicated range will be described. In FIG. 9, steps S601 to S611 are the same as those in FIG. 6, and therefore descriptions thereof will be omitted.

In step S901, the camera microcomputer 206 communicates with the lens microcomputer 111 to acquire information on the AF limit range. Subsequently, in step S902, the camera microcomputer 206 determines whether or not the interchangeable lens 100 has the AF limit range. If the interchangeable lens 100 has the AF limit range, the process proceeds to step S903. In step S903, the camera microcomputer 206 displays the AF limit range on the display unit 204, and this flow (distance index display method) ends. On the other hand, if the interchangeable lens 100 does not have the AF limit range in step S902, this flow (distance index display method) ends.

FIG. 10 is a diagram illustrating a distance index display including the limit range (AF limit range) and the MF dedicated range. When the AF limit range is added on the distance index bar as illustrated in FIG. 10, the range of the object distance of 0.2 m to 0.5 m is the MF dedicated range, the user can know that the AF limit range is in a range of 0.5 m to 1.0 m. By displaying the AF limit range and the MF dedicated range on the distance index display in this way, the user can visually know the switching between the AF limit range, the MF dedicated range, and the AF available range, and the operability is improved.

Figure 11:
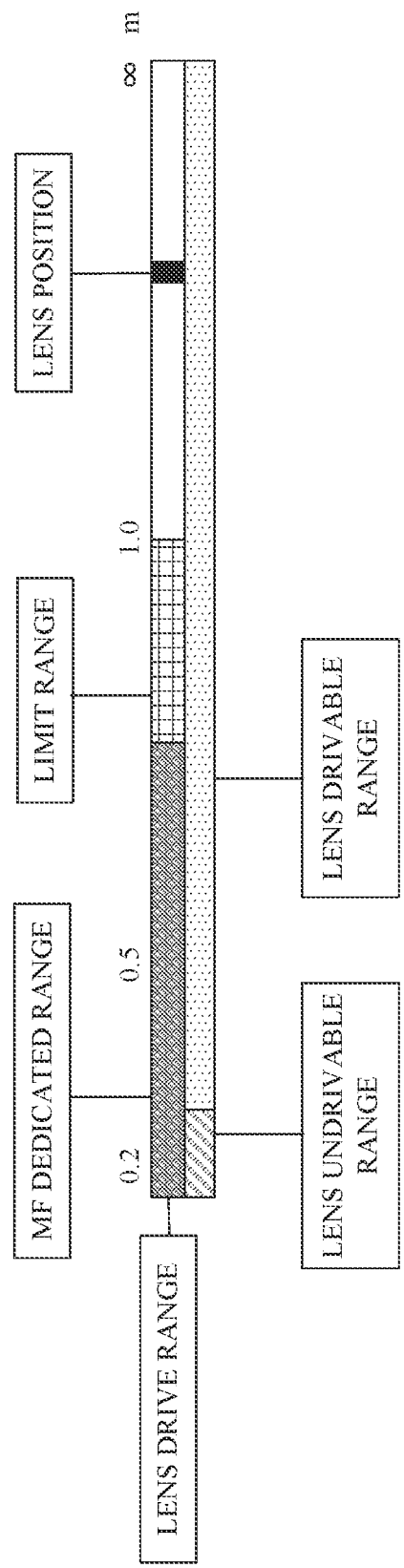
FIG. 11 is a diagram illustrating a distance index display in which the MF dedicated range is variable in the second embodiment.

In the flow of FIG. 9, the display such as the lens position is updated by repeating the process at predetermined cycles. FIG. 11 is a diagram illustrating a distance index display in which the MF dedicated range is variable. In step S609 of FIG. 9, the interchangeable lens 100 may change the display range of the MF dedicated range as illustrated in FIG. 11 by periodically changing the MF dedicated range. Further, in FIG. 11, the range to be changed is limited to the MF dedicated range, but the AF limit range and the distance scale information may be updated. At this time, the display information on the range may be changed in conjunction with the change of a state (zoom position or aperture value (F number)) of the optical member (zoom lens 102 or aperture unit 103) of the interchangeable lens 100.

Third Embodiment

Figure 12A:
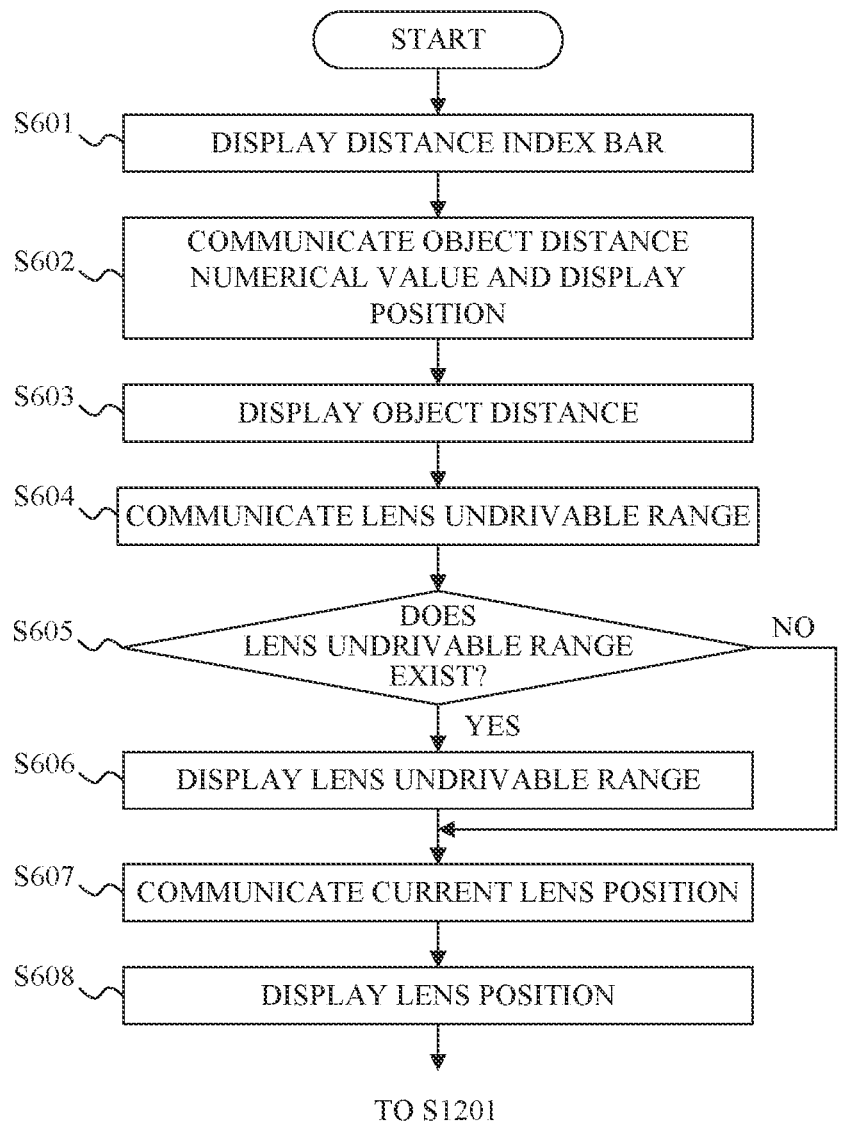
FIGS. 12A and 12B are flowcharts illustrating a distance index display method in a third embodiment.
Figure 12B:
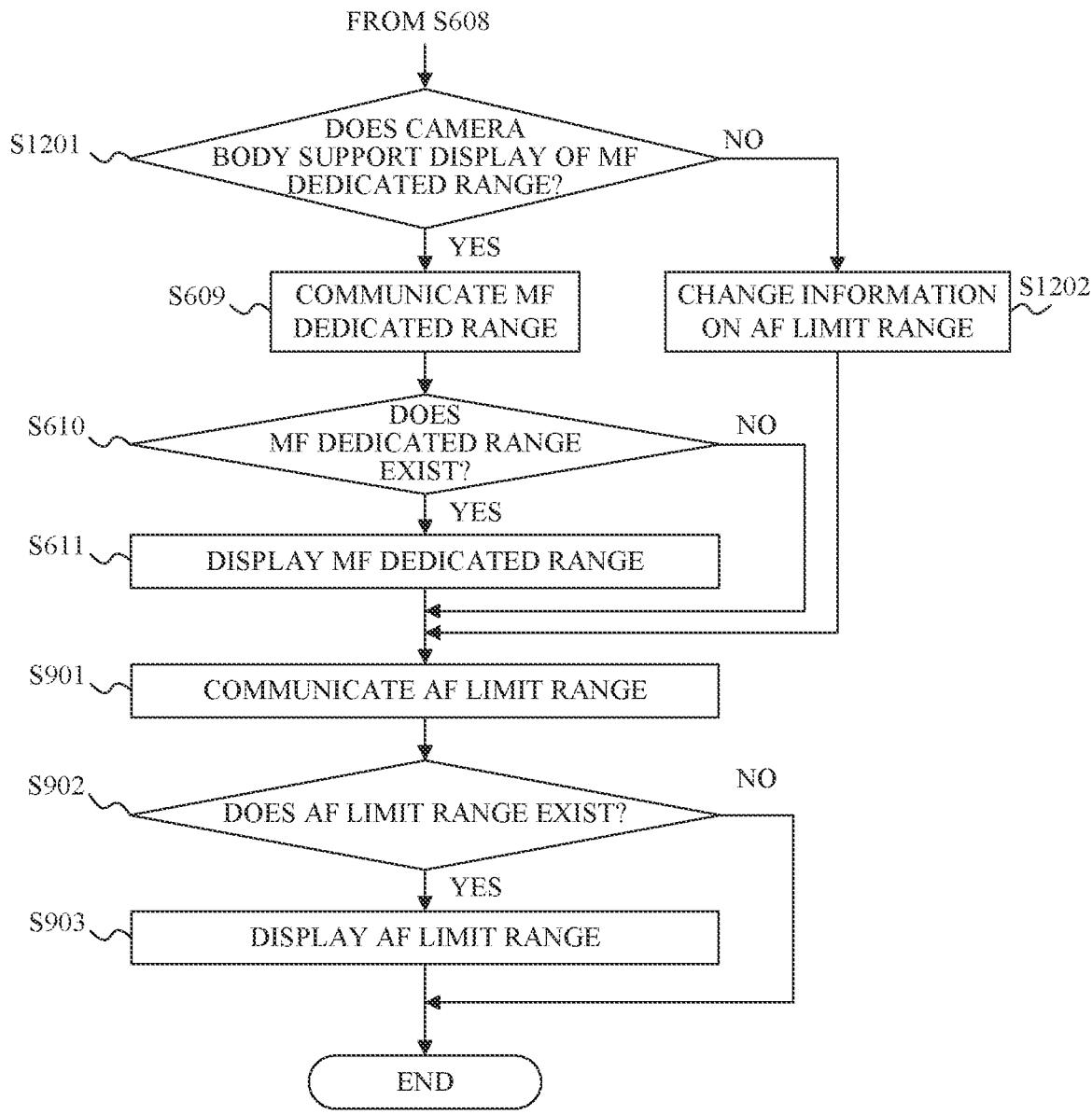
Figure 13:
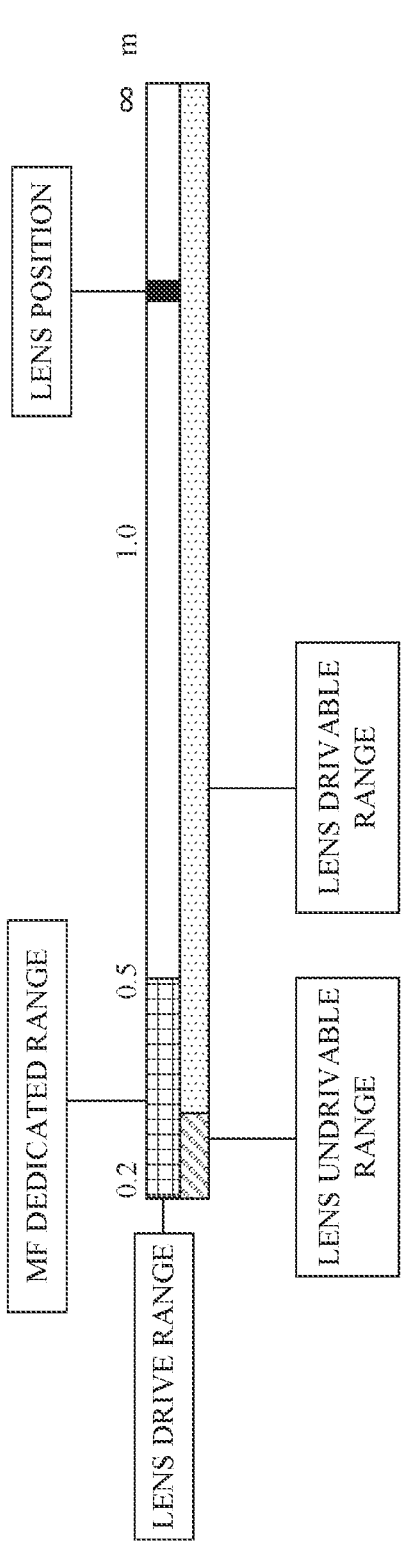
FIG. 13 is a diagram illustrating a distance index display representing the MF dedicated range in the AF limit range in the third embodiment.

Next, referring to FIGS. 12A, 12B, and 13. Embodiment 3 of the present invention will be described. In order to display the MF dedicated range on the distance index, it is necessary to use the camera body 200 that supports the display of the MF dedicated range. FIGS. 12A and 12B are flowcharts illustrating a control method (distance index display method) in this embodiment, and illustrates a method of displaying the distance index including the MF dedicated range for a camera body that does not support the display of the MF dedicated range (that is, a camera body that does not have a function of displaying the MF dedicated range). FIG. 13 is a diagram illustrating a distance index display representing the MF dedicated range in the AF limit range. Since steps S601 to S611 in FIGS. 12A and 12B are the same as those in FIG. 6, their descriptions will be omitted. Further, in FIG. 12B, since steps S901 to S903 are the same as those in FIG. 9, their descriptions will be omitted.

In step S1201, the lens microcomputer 111 determines whether or not the camera body 200 supports the display of the MF dedicated range. If the camera body 200 supports the display of the MF dedicated range, the process proceeds to step S609. On the other hand, if the camera body 200 does not support the display of the MF dedicated range, the process proceeds to step S1202. The fact that the camera body 200 does not support the display of the MF dedicated range means that the camera body 200 does not have the function of displaying the MF dedicated range. For example, this includes, but is not limited to, a case where the camera body 200 does not support communication related to the MF dedicated range, and a case where the camera body 200 cannot display the MF dedicated range and the AF limit range separately.

In step S1202, the lens microcomputer 111 changes the information on the AF limit range according to the current MF dedicated range, and proceeds to step S901. That is, the lens microcomputer 111 changes the information on the AF limit range so that the current MF dedicated range is transmitted to the camera body 200 as the information on the AF limit range.

As described above, in this embodiment, the first control unit 111a is effective in the first drive range of the focus lens 105 and is limited in the second drive range of the focus lens 105. The lens communication unit (communication unit) 112 transmits information on a change in the second drive range according to a change in the state of the optical member (zoom position, aperture value (F number), etc.) to the camera body 200. The information on the change in the second drive range transmitted to the camera body 200 may be an amount of change in the second drive range or the information of the second drive range itself that changes every moment. Preferably, the second drive range has the MF dedicated range in which all the functions of the first control unit 111a are invalidated, and the AF limit range in which a part of the functions of the first control unit 111a is restricted. When the MF dedicated range can be displayed on the display unit 204 of the camera body 200, the lens communication unit 112 transmits the display information of the MF dedicated range to the camera body 200. On the other hand, when the MF dedicated range cannot be displayed on the display unit 204, the lens communication unit 112 transmits the display information of the MF dedicated range to the camera body 200 as the display information of the AF limit range. Preferably, the display information of the AF limit range changes based on the state of the optical member.

When the camera body does not support the display of the MF dedicated range as described above, the AF limit range display can be pseudo-displayed as the MF dedicated range by changing the information on the AF limit range. Although the AF limit range and the MF dedicated range are different ranges from each other, the difference from the AF available range can be expressed, so that the user's operability can be improved. The flow of FIGS. 12A and 12B are repeated at predetermined cycles to update the display such as the lens position. In step S1201 of FIG. 12B, the interchangeable lens 100 may change the display range of the AF limit range by periodically changing the information on the AF limit range.

(Modification)

Next, referring to FIGS. 14 and 15, a modification of each embodiment will be described. In the distance index described in each embodiment above, the lens position on the distance index bar moves to represent the object distance of the current focus lens. Further, as a distance index display method, there is a display method in which the lens position is fixed at the center and the distance scale moves instead of the lens position by driving the focus lens.

Figure 14:
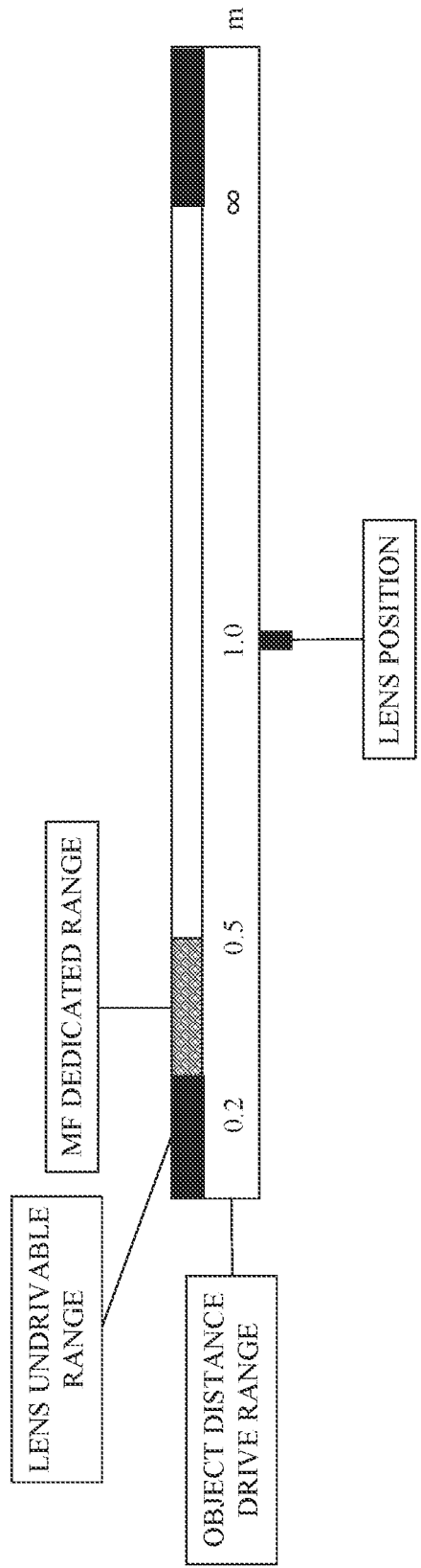
FIG. 14 is a diagram illustrating a distance index display method including an MF dedicated range in a modified example.
Figure 15:
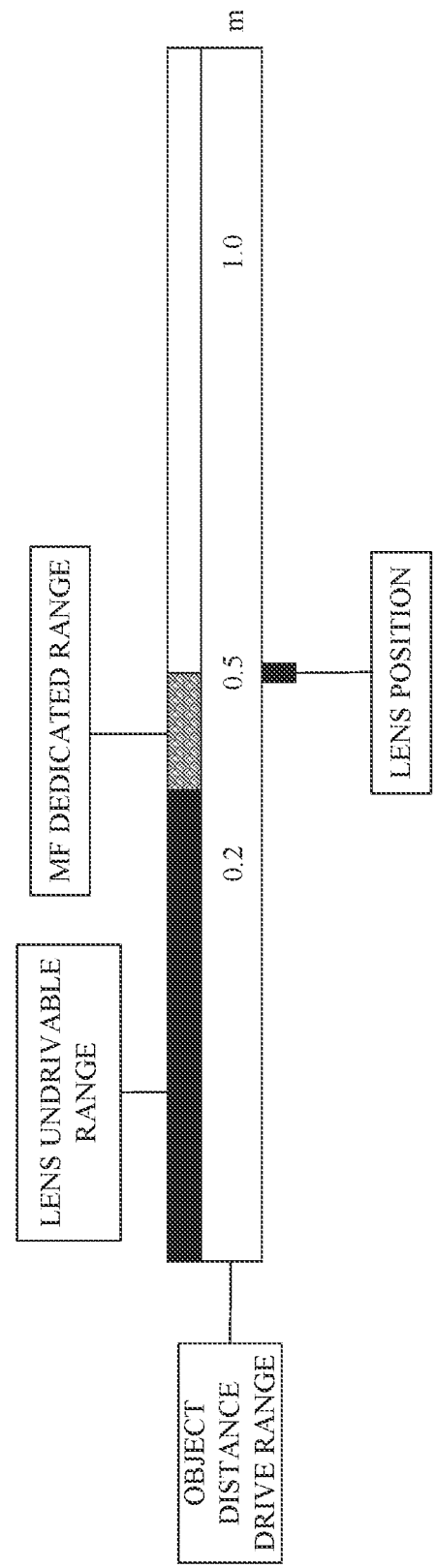
FIG. 15 is a diagram illustrating an operation of the distance index display method in the modified example.

FIG. 14 is a diagram illustrating a distance index display method including the MF dedicated range in this modification. FIG. 15 is a diagram illustrating the operation of the distance index display method in this modification. FIGS. 14 and 15 illustrate an example in which for the same focus lens as in FIG. 7, the distance index is displayed by moving the distance scale. FIG. 14 illustrates a display when the current focus lens position exists at an object distance of 1.0 m. FIG. 15 illustrates a display when the current lens position exists at an object distance of 0.5 m. In both the examples of FIGS. 14 and 15, it is possible to display the MF dedicated range as in FIG. 7. Although the range is expressed by using a bar in this example, the range may be expressed by changing the color of the distance scale.

As described above, the form of the display method of the distance index is not limited, and the MF dedicated range may be displayed in any form. Further, the display method of the distance index may be switched by the setting of the camera body 200 or the setting of the interchangeable lens 100. As a result, the user can know the range where the focus lens is located in any form of the display method, and the operability can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide a lens apparatus, an image pickup apparatus, a control method, and a non-transitory computer-readable storage medium which are capable of easily grasping that the current position of the focus lens is in the MF dedicated range even when the camera body does not support the display of the MF dedicated range.

In each embodiment, the display unit 204 is provided on the camera body 200, but the embodiment is not limited to this, and the display unit may be provided on the interchangeable lens 100. Further, in each embodiment, the lens microcomputer 111 executes functions as the first control unit 111a, the second control unit 111b, and the third control unit 111c, but is not limited thereto. For example, the camera microcomputer 206 may be configured to perform at least one function of the first control unit, the second control unit, or the third control unit. In this case, the image pickup apparatus 10 (the camera body 200) may include the display unit 204 capable of displaying the object distance in the optical system capable of performing first control in which the focus lens 105 is automatically adjusted to the in-focus position and second control in which the focus lens 105 is adjusted based on the operation amount of the user, and the control unit (camera microcomputer 206) that controls the display unit 204, and control unit controls the display unit 204 so that information corresponding to the current focus lens position and information on a first range (second drive range) in which the focus lens 105 cannot be driven by the first control and the focus lens 105 can be driven by the second control are displayed together. Further, in each embodiment, the display unit 204 may be configured to display the MF dedicated range when the focus lens 105 is adjusted by the second control unit 111b.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-014224, filed on Jan. 30, 2020, and No. 2020-014225, filed on Jan. 30, 2020, each of which is hereby incorporated by reference herein in its entirety.

What is claimed is:

1. An image pickup apparatus comprising:
a display unit; and
a controller configured to control the display unit and to adjust a focus lens,
wherein the controller is configured to perform first control in which the focus lens is automatically adjusted to an in-focus position and second control in which the focus lens is adjusted based on an operation amount of a user,
wherein the first control and the second control work in a first drive area of the focus lens, and the first control is disabled and the second control works in a second drive area of the focus lens,
wherein the controller is configured to control the display unit so that information corresponding to a current focus lens position and information on the second drive area are displayed together, and
wherein the second drive area changes according to a zoom position of an optical system including the focus lens.

2. The image pickup apparatus according to claim 1, further comprising a communication unit configured to communicate with a lens apparatus including the focus lens, wherein the communication unit is configured to acquire display information for displaying the second drive area on the display unit from the lens apparatus.

3. The image pickup apparatus according to claim 2, wherein the display information changes based on the zoom position of the optical system included in the lens apparatus.

4. The image pickup apparatus according to claim 2, wherein the display information changes based on an aperture value of an optical system included in the lens apparatus.

5. The image pickup apparatus according to claim 1, wherein the display unit is configured to display the first drive area separately from the second drive area range.

6. The image pickup apparatus according to claim 5, wherein the display unit is configured to display the first drive area and the second drive area in different colors.

7. The image pickup apparatus according to claim 1, wherein the display unit is configured to notify that the focus lens is located in the second drive area.

8. The image pickup apparatus according to claim 7, wherein when the focus lens is located in the second drive area, at least a part of the display unit blinks.

9. The image pickup apparatus according to claim 1, wherein when the focus lens is adjusted by the second control, the display unit is configured to display the second drive area.

10. The image pickup apparatus according to claim 1, wherein the display unit is configured to display information on a distance from a shortest shooting distance to a predetermined object distance, the first drive area, the second drive area, and a current drivable range.

11. The image pickup apparatus according to claim 1, wherein when the current focus lens position is within the second drive area, the first control does not start.

12. A lens apparatus comprising:
an optical system including a focus lens;
a display unit; and
a controller configured to control the display unit and to adjust a focus lens,
wherein the controller is configured to perform first control in which the focus lens is automatically adjusted to an in-focus position and second control in which the focus lens is adjusted based on an operation amount of a user, wherein the first control and the second control work in a first drive area of the focus lens, and the first control is disabled and the second control works in a second drive area of the focus lens, wherein the controller is configured to control the display unit so that information corresponding to a current focus lens position and information on the second drive area are displayed together, and wherein the second drive area changes according to a zoom position of the optical system.

13. A lens apparatus removably attached to a camera body, the lens apparatus comprising:

a focus lens;

a controller configured to adjust the focus lens; and a communication unit capable of communicating with the camera body, wherein the controller is configured to perform first control in which the focus lens is automatically adjusted to an in-focus position and second control in which the focus lens is adjusted based on an operation amount of a user, wherein the first control and the second control work in a first drive area of the focus lens, and the first control is disabled and the second control works in a second drive area of the focus lens, and wherein the communication unit is configured to transmit, to the camera body, information on a change of the second drive area according to a change of a state of an optical member.

14. The lens apparatus according to claim 13, wherein the communication unit is capable of transmitting, to the camera body, information on an AF limit range in which a part of the functions of automatically adjusting the focus lens to the in-focus position is limited.

15. The lens apparatus according to claim 14, wherein the communication unit is configured to transmit, to the camera body, information on a change of the AF limit range according to the change of the state of the optical member.

16. The lens apparatus according to claim 14, wherein in a case where the camera body does not support displaying the second drive area, the communication unit is configured to transmit, to the camera body, information on the second drive area as information on the AF limit range.

17. The lens apparatus according to claim 13, wherein the state of the optical member is a zoom position.

18. The lens apparatus according to claim 13, wherein the state of the optical member is an aperture value.

* * * * *